(12) United States Patent
Yeh et al.

(10) Patent No.: US 9,092,107 B2
(45) Date of Patent: Jul. 28, 2015

(54) ELECTROMAGNETIC PEN WITH ELECTROMAGNETIC AND INK WRITING FUNCTIONS

(71) Applicant: Wacom Co., Ltd., Saitama (JP)

(72) Inventors: Chia-Jui Yeh, Taipei (TW);
Chung-Hsuan Li, Hsinchu (TW)

(73) Assignee: Wacom Co., Ltd., Saitama (JP)

( * ) Notice: Subject to any disclaimer, the term of this patent is extended or adjusted under 35 U.S.C. 154(b) by 174 days.

(21) Appl. No.: 13/722,726

(22) Filed: Dec. 20, 2012

(65) Prior Publication Data

US 2014/0118311 A1    May 1, 2014

(30) Foreign Application Priority Data

Oct. 25, 2012   (TW) .............................. 101220640 U

(51) Int. Cl.
*G06F 3/033*     (2013.01)
*G06F 3/046*     (2006.01)
*G06F 3/0354*    (2013.01)

(52) U.S. Cl.
CPC ............ *G06F 3/046* (2013.01); *G06F 3/03545* (2013.01)

(58) Field of Classification Search
CPC .............................. G06F 3/046; G06F 3/03545
USPC .......................................... 345/179; 178/19.01
See application file for complete search history.

(56) References Cited

U.S. PATENT DOCUMENTS

| 5,576,502 | A  | * | 11/1996 | Fukushima et al. | ........ 73/862.68 |
| 2005/0122319 | A1 | * | 6/2005 | Sakurai et al. | ................. 345/179 |
| 2007/0195069 | A1 | * | 8/2007 | Kable et al. | .................... 345/179 |
| 2010/0294574 | A1 | * | 11/2010 | Chen | ........................... 178/19.05 |
| 2013/0038579 | A1 | * | 2/2013 | Boyd et al. | ..................... 345/179 |

* cited by examiner

*Primary Examiner* — Jonathan Boyd
(74) *Attorney, Agent, or Firm* — Seed IP Law Group PLLC

(57) ABSTRACT

An electromagnetic pen with electromagnetic and ink writing functions is disclosed. The electromagnetic pen includes at least one pen tube assembly, a core mechanism, a pen tip, a ferrite core, a core holder, an elastic conductor and a circuit board. The pen tip and the core are configured in the pen tube assembly and are controlled by the core mechanism.

9 Claims, 3 Drawing Sheets

ELECTROMAGNETIC PEN WITH ELECTROMAGNETIC AND INK WRITING FUNCTIONS

CROSS-REFERENCE TO RELATED APPLICATIONS

The entire contents of Taiwan Patent Application No. 101220640, filed on Oct. 25, 2012, from which this application claims priority, are incorporated herein by reference.

FIELD OF THE INVENTION

The present invention generally relates to an electromagnetic pen, more particularly to an electromagnetic pen with electromagnetic and ink writing functions.

BACKGROUND OF THE INVENTION

The operation principle of electromagnetic type input technology is performed by a circuit board with a plurality of antennas or sensor coils arranged along x and y axial directions and an electromagnetic pen which can emit electromagnetic signals. The sensing plane of an electromagnetic input apparatus includes a plurality of antennas or sensor coils. The antennas or sensor coils are arranged under a work surface or a display panel of the electromagnetic input apparatus. The coordinates of the electromagnetic pen are obtained through the transmitting and receiving of electromagnetic waves between the circuit of the electromagnetic pen and the antennas or the sensor coils.

Input apparatuses which use the electromagnetic type input technology comprise smart mobile devices (Smart Phone), digitizers or tablets or e-books/green books and are used with electromagnetic pens or styluses.

The circuit of the electromagnetic pen usually comprises an inductor, a capacitor and relative components enclosed in a case. The inductor constituted by a ferrite core winded with a metal coil and the capacitor constitute the circuit to transmit and receive electromagnetic signals with the antennas or sensor coils. The frequency variation of the circuit is achieved via changing the capacitance and the inductance so that the design of the electromagnetic pen can choose either the inductor or capacitor to be variable or adjustable according to the requirement.

The invention provides an electromagnetic pen with electromagnetic and ink writing functions used with an input apparatus.

BRIEF SUMMARY OF THE INVENTION

One object of the invention is to provide an electromagnetic pen with electromagnetic and ink writing functions. To perform the function of the electromagnetic pen, the force needed to perform the writing function applied upon the electromagnetic pen changes the contact status between the conductive terminals of the circuit board.

The invention provides an electromagnetic pen comprising at least one pen tube assembly, a core mechanism, a pen tip and a pen core in the pen tube assembly, a ferrite core and a conductive coil winding the ferrite core in the pen tube assembly, a core holder, a switch, a conductive device and a circuit board. The pen tip and the pen core are controlled by the core mechanism. The pen tip is configured to be located on one end of the pen core so that the pen tip is able to extend out from or retract back to the pen tube assembly. The pen tip has an ink writing function. The ferrite core is hollow so that the pen core is able to move axially inside the ferrite core. The core holder accommodates the other end of the pen core. The switch is configured to partially penetrate through and extend out from an opening of the pen tube assembly and to push the core mechanism. One end of the circuit board toward the pen tip has a plurality of conductive terminals. The conductive device is configured to be located between the circuit board and the core holder, wherein the conductive coil connects to the circuit board.

DETAILED DESCRIPTION OF THE INVENTION

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations are not described in detail in order not to unnecessarily obscure the present invention.

Figure 1:
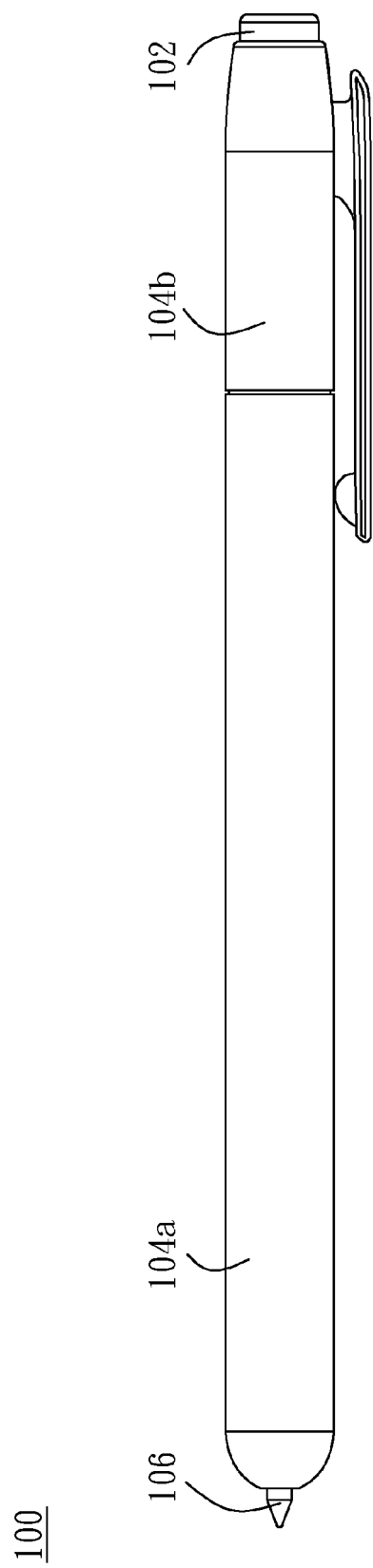
FIG. 1 shows an electromagnetic pen according to one embodiment of the present invention.

FIG. 1 shows an electromagnetic pen according to one embodiment of the present invention. As shown in FIG. 1, the electromagnetic pen 100 comprises a switch 102, pen tube assemblies 104a and 104b (first and second pen tube assemblies), and a pen tip 106.

Figure 1A:
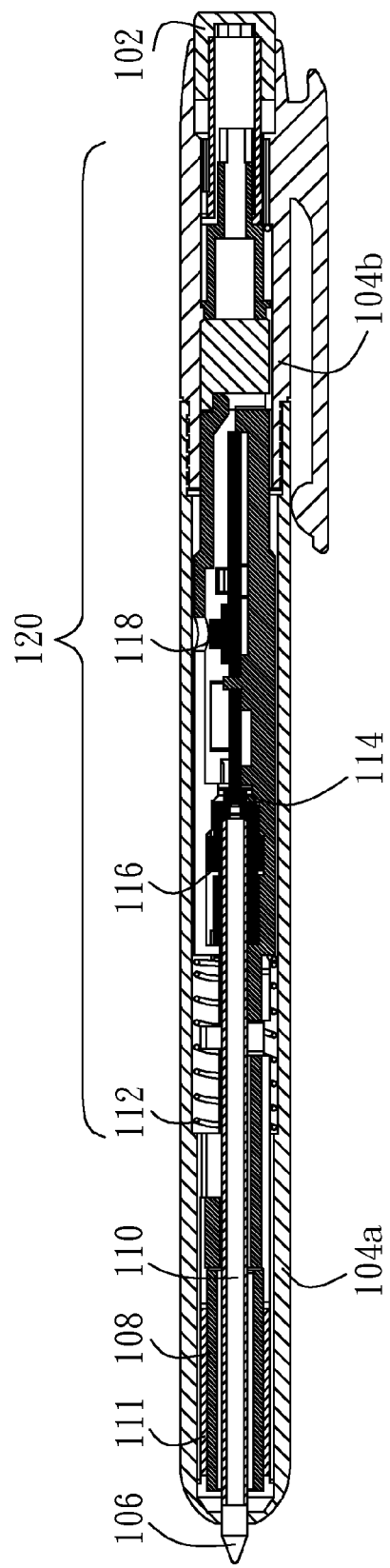
FIG. 1A shows a cross-sectional view of an electromagnetic pen according to one embodiment of the present invention.

FIG. 1A shows a cross-sectional view of an electromagnetic pen according to one embodiment of the present invention. The electromagnetic pen 100 further comprises a ferrite core 108, a pen core 110, a conductive coil 111, a spring 112, an elastic conductor 114, a core holder 116, a circuit board 118 and a core mechanism 120 beside the switch 102, the pen tube assemblies 104a and 104b, and the pen tip 106. The pen tube assemblies 104a and 104b comprise hollow pen tube assemblies made of plastic or metal materials so as to accommodate the ferrite core 108, the pen core 110, the conductive coil 111, the spring 112, the elastic conductor 114, the core holder 116, the circuit board 118 and the core mechanism 120.

In one embodiment of the invention, the pen tip 106 connects with the pen core 110 and both penetrate through the pen tube assembly 104a. The pen tip 106 extends out from the opening of one end of the pen tube assembly 104a. The pen tip 106 provides the electromagnetic pen 100 with an ink writing function and the pen core 110 provides the ink. The other end of the pen core 110 is accommodated by the core holder 116.

In one embodiment of the invention, the ferrite core 108 is configured to be located in the hollow pen tube assembly 104a. The ferrite core 108 is hollow so that the pen core 110 is able to move axially inside the ferrite core 108. The conductive coil 111 comprising a plurality of coils winds around the ferrite core 108. The conductive coil 111 comprises an enameled copper wire comprising a plurality of coils. The conductive coil 111 winding the ferrite core 108 connects to the circuit of the circuit board 118. The ferrite core 108 with the conductive coil 111 and a capacitor on the circuit board 118 form a portion of a LC circuit.

In one embodiment of the invention, the circuit board 118 is configured to be secured in the core mechanism 120 and moves with the core mechanism 120 inside the pen tube assemblies 104a and 104b. The end of the circuit board 118 toward the pen tip 106 of the electromagnetic pen 100 has a plurality of conductive terminals 119. The conductive device 114 is configured to be located between the circuit board 118 and the core holder 116. The conductive terminals 119 of the circuit board 118 are electrically connected through the conductive device 114 after the core holder 116 pushes the conductive device 114. Detail content will be further described in the following description.

The circuit board 118 comprises a printed circuit board with a LC circuit and a controller so that the electromagnetic pen 100 is able to transmit electromagnetic signals to an electromagnetic input apparatus, or to receive electromagnetic signals from electromagnetic antenna loops or sensor coils of the electromagnetic input apparatus. The electromagnetic input apparatus comprises a smart mobile communication devices, digitizer or tablet or eBook.

In one embodiment of the invention, the switch 102 is configured to partially penetrate through and extend out from the opening of the pen tube assembly 104b as a switch of the core mechanism 120. The core mechanism 120 can be any suitable mechanical configuration. The core mechanism 120 as shown in FIG. 1A is only an example, not a limitation. The core mechanism 120 is activated by the switch 102. When the switch 102 is pressed, the core mechanism 120 together with the circuit board 118 and the core holder 116 will press the spring 112 to move the pen core 110 axially. To perform the ink writing function, the pen core 110 drives the pen tip 106 to extend out from the pen tube assembly 104a while the core mechanism 120 is secured by any suitable securing configuration and the spring 112 is deformed to a compressed status. To retract the pen tip 106, pressing the switch 102 will render the core mechanism 120 escaping from the securing configuration and push the core mechanism 120 back to the original position via the elastic restoring force of the spring 112.

In one embodiment of the invention, pressing the switch 102 will cause the core mechanism 120 to drive the core holder 116 and the pen core 110 to move axially, while the pen core 110 penetrating through the ferrite core 108 will drive the pen tip 106 to extend out from the pen tube assembly 104a. To perform the writing function, pressing the pen tip 106 drives the pen core 110 and the core holder 116, and the core holder 116 further contacts with the conductive device 114 configured to be located between the core holder 116 and the circuit board 118. The core holder 116 pushes the conductive device 114 to alter the contact status between the conductive terminals 119 of the circuit board 118. When the conductive terminals 119 of the circuit board 118 are connected, the electronic properties of the circuit of the circuit board 118 such as the frequency of the LC circuit will be changed.

Figure 2:
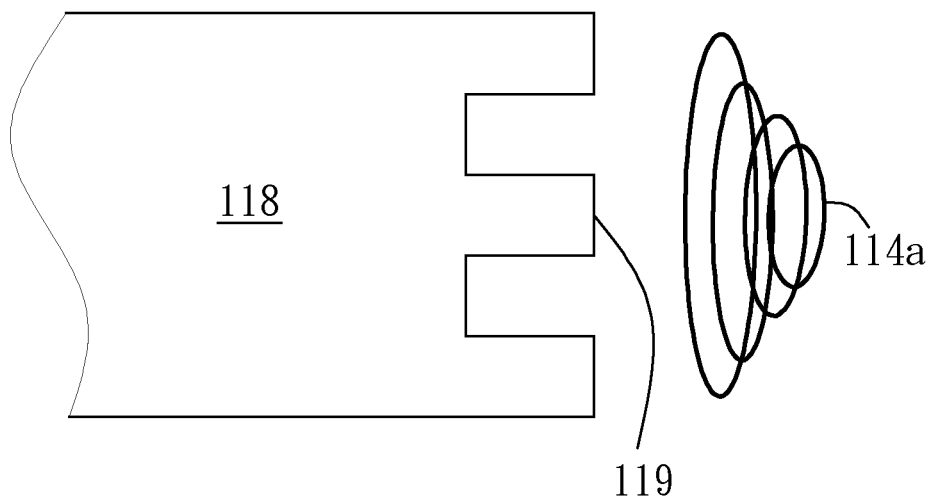
FIG. 2 shows a switch constituted by a conductive device and conductive terminals of a circuit board according to one embodiment of the invention.

In one embodiment of the invention, the conductive device 114 comprises a thin cone spring or a conductive rubber, but is not limited to a cone spring or a conductive rubber. FIG. 2 shows a switch constituted by a conductive device and conductive terminals of a circuit board according to one embodiment of the invention. The conductive device comprises a cone spring 114a. When the core holder 116 pushes the cone spring 114a, the center of the cone spring 114a will contact the conductive terminals 119 on one end of the circuit board 118 to electrically connect the conductive terminals 119 and change the circuitry of the circuit board 119 so as to change the electronic properties of the circuit of the circuit board 118 such as the frequency of the LC circuit. The complete separation between the cone spring 114a and the circuit board 118 shown in FIG. 2 is only for convenience and for better understanding. When the core holder 116 does not push the cone spring 114a, the center of the cone spring 114a does not contact the conductive terminals 119 on one end of the circuit board 118 while the other portion of the cone spring 114a contacts the conductive terminals 119.

Figure 3:
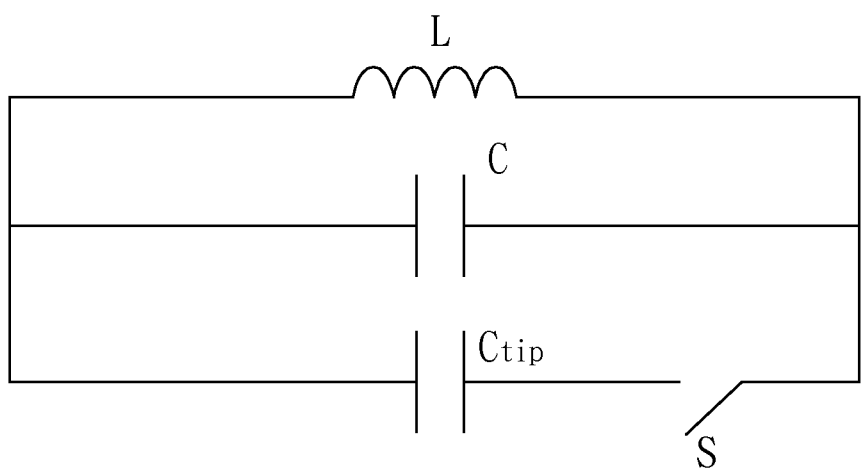
FIG. 3 shows a schematic diagram of the LC circuit according to one embodiment of the invention.

FIG. 3 shows a schematic diagram of the LC circuit according to one embodiment of the invention. The inductor L is the equivalent inductance of the LC circuit. The inductor L comprises the ferrite core 108 and the conductive coil 111. The capacitors C and $C_{tip}$ are on the circuit board 118, wherein the capacitor $C_{tip}$ is controlled by the switch S. The switch S comprises conductive device 114 and the conductive terminals 119. In one embodiment of the invention, the switch S controls the capacitor $C_{tip}$ to connect with the capacitor C in parallel and the LC circuit of the circuit board 118. The connection between the capacitors C and $C_{tip}$ in parallel will increase the equivalent capacitance of the LC circuit and decrease the frequency of the LC circuit.

When the core holder 116 pushes the conductive device 114 to connect the conductive terminals 119 on one end of the circuit board 118, the change of the frequency of the LC circuit is able to initiate, but is not limited to, the function of the electromagnetic pen such as the writing function.

It is noted that the embodiments of the invention focus on the configuration of the electromagnetic pen rather than the function thereof. Thus the configuration of the embodiments of the invention is able to be applied any function of the electromagnetic pen according to various requirements. The function which the configuration of the embodiments of the invention is applied to perform depends on circuit design.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An electromagnetic pen, comprising at least one pen tube assembly;
   a core mechanism;
   a pen tip and a pen core in the pen tube assembly, the pen tip and the pen core being controlled by the core mechanism, the pen tip being configured to be located on one end of the pen core so that the pen tip is able to extend out from or retract back to the pen tube assembly by the core mechanism, the pen tip having an ink writing function, and the pen core providing an ink for the ink writing function;
   a ferrite core and a conductive coil winding the ferrite core in the pen tube assembly, the ferrite core being hollow so that the pen core is able to move axially inside the ferrite core;
   a core holder, the core holder accommodating the other end of the pen core;

a switch being configured to partially penetrate through and extend out from an opening of the pen tube assembly and to push the core mechanism;

a conductive device comprising a cone spring; and a circuit board, one end of the circuit board toward the pen tip having a plurality of conductive terminals, the cone spring being located between the circuit board and the core holder and a periphery of a base of the cone spring being in electrical contact with peripheral ones of the conductive terminals, wherein the conductive coil connects to the circuit board;

wherein when the pen core moves axially inside the ferrite core between an, extended position and a retracted position, the center of the cone spring correspondingly moves between a first position, at which it is not in electrical contact with a central one of the conductive terminals of the circuit board, and a second position, at which it comes in electrical contact with said central one of the conductive terminals, to thereby alter electrical contact status between the peripheral ones and the central one of the conductive terminals.

2. The electromagnetic pen of claim 1, wherein the electromagnetic pen is used with an electromagnetic input apparatus comprising a smart mobile communication devices, digitizer or tablet or eBook.

3. The electromagnetic pen of claim 1 further comprising a LC circuit, wherein when the center of the cone spring electrically contacts the central one of the conductive terminals, a frequency of the LC circuit is decreased.

4. The electromagnetic pen of claim 3, wherein when the center of the cone spring electrically contacts the central one of the conductive terminals, an equivalent capacitance of the LC circuit is increased to decrease the frequency.

5. An electromagnetic pen used with an electromagnetic input apparatus, comprising a first and a second pen tube assemblies;

a core mechanism;

a pen tip and a pen core in the first pen tube assembly, the pen tip and the pen core being controlled by the core mechanism, the pen tip being configured to be located on one end of the pen core so that the pen tip is able to extend out from or retract back to the first pen tube assembly by the core mechanism, the pen tip having an ink writing function, and the pen core providing an ink for the ink writing function;

a ferrite core and a conductive coil winding the ferrite core in the first pen tube assembly, the ferrite core being hollow so that the pen core is able to move axially inside the ferrite core;

a core holder, the core holder accommodating the other end of the pen core;

a conductive device comprising a cone spring; and a circuit board, one end of the circuit board toward the pen tip having a plurality of conductive terminals, the cone spring being located between the circuit board and the core holder and a periphery of a base of the cone spring being in electrical contact with peripheral ones of the conductive terminals, wherein the conductive coil connects to the circuit board;

wherein when the pen core moves axially inside the ferrite core between an extended position and a retracted position, the center of the cone spring correspondingly moves between a first position, at which it is not in electrical contact with a central one of the conductive terminals of the circuit board, and a second position, at which it comes in electrical contact with said central one of the conductive terminals, to thereby alter an electrical contact status between the peripheral ones and the central one of the conductive terminals.

6. The electromagnetic pen of claim 5, wherein the electromagnetic input apparatus comprises a smart mobile communication devices, digitizer or tablet or eBook.

7. The electromagnetic pen of claim 5 further comprising a switch being configured to partially penetrate through and extend out from an opening of the second pen tube assembly and to push the core mechanism.

8. The electromagnetic pen of claim 5 further comprising a LC circuit, wherein when the center of the cone spring electrically contacts the central one of the conductive terminals, a frequency of the LC circuit is decreased.

9. The electromagnetic pen of claim 8, wherein when the center of the cone spring electrically contacts the central one of the conductive terminals, an equivalent capacitance of the LC circuit is increased to decrease the frequency.

\* \* \* \* \*